US012591524B2

(12) United States Patent
Naruboina et al.

(10) Patent No.: US 12,591,524 B2
(45) Date of Patent: Mar. 31, 2026

(54) PERIPHERAL DEVICE SHARING BETWEEN DATA PROCESSING SYSTEMS

(71) Applicant: Dell Products L.P., Round Rock, TX (US)

(72) Inventors: Guru Prasad Yadav Naruboina, Bangalore (IN); Kalyani Korubilli, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/785,358

(22) Filed: Jul. 26, 2024

(65) Prior Publication Data

US 2026/0030178 A1 Jan. 29, 2026

(51) Int. Cl.
| | |
|---|---|
| *G06F 3/00* | (2006.01) |
| *G06F 13/10* | (2006.01) |
| *G06F 13/42* | (2006.01) |

(52) U.S. Cl.
CPC .......... *G06F 13/10* (2013.01); *G06F 13/4221* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 5,339,404 | A | * | 8/1994 | Vandling, III ...... G06F 11/1683 |
| | | | | 714/1 |
| 5,740,429 | A | | 4/1998 | Wang |

| | | | |
|---|---|---|---|
| 7,418,545 | B2 | 8/2008 | Marushak |
| 7,865,775 | B2 | 1/2011 | Yao |
| 7,974,286 | B2 | 7/2011 | Keohane et al. |
| 10,416,988 | B1 | 9/2019 | Kulchytskyy |
| 2002/0095611 | A1 | 7/2002 | Jochiong |
| 2003/0182577 | A1 | 9/2003 | Mocek |
| 2008/0059720 | A1 * | 3/2008 | Rothman ................ G06F 9/526 |
| | | | 711/153 |
| 2009/0132838 | A1 | 5/2009 | Cherian |
| 2011/0119686 | A1 | 5/2011 | Chen |

(Continued)

OTHER PUBLICATIONS

Cycuity, "Detect and Prevent Security Vulnerabilities in your Hardware Root of Trust," 2022. Web Page <https://cycuity.com/wp-content/uploads/2022/06/Cycuity_White-Paper_Detect-Security-Vulnerabilities-HRoT.pdf> accessed on Jul. 23, 2024 (17 Pages).

(Continued)

*Primary Examiner* — Henry Tsai
*Assistant Examiner* — Dean Phan
(74) *Attorney, Agent, or Firm* — WOMBLE BOND DICKINSON (US) LLP

(57) ABSTRACT

Methods and systems for managing a data processing system are disclosed. A management controller installed within the data processing system that operates independently from a central processing unit (CPU) (e.g., a motherboard) of the data processing system may manage access of the data processing system to various peripheral devices. The peripheral devices may be connected to the data processing system via a compute express link (CXL) switch. Other data processing systems may also be connected to the peripheral devices via the CXL switch, creating a shared environment where the capabilities and functionalities of the peripheral devices can be shared between these data processing systems.

20 Claims, 8 Drawing Sheets

(56) References Cited

U.S. PATENT DOCUMENTS

| | | | |
|---|---|---|---|
| 2014/0195684 A1 * | 7/2014 | Taaghol | H04L 67/52 709/226 |
| 2014/0258526 A1 | 9/2014 | Le Sant | |
| 2015/0287273 A1 | 10/2015 | Panzarella | |
| 2015/0304343 A1 | 10/2015 | Cabrera | |
| 2015/0309559 A1 | 10/2015 | Jacobson | |
| 2018/0011524 A1 | 1/2018 | Stumpf | |
| 2020/0044868 A1 | 2/2020 | Vakulenko | |
| 2020/0097379 A1 | 3/2020 | Truong | |
| 2020/0218527 A1 | 7/2020 | Ganesan | |
| 2020/0257517 A1 | 8/2020 | Seater | |
| 2021/0042062 A1 * | 2/2021 | Betsuno | G06F 3/0658 |
| 2023/0008238 A1 | 1/2023 | Mugunda | |
| 2023/0315485 A1 | 10/2023 | Paulraj | |
| 2023/0376575 A1 * | 11/2023 | Anzai | G06F 21/121 |
| 2024/0054039 A1 | 2/2024 | Srinivasan | |

OTHER PUBLICATIONS

Elmaghbub, Abdurrahman, et al., "Domain-Agnostic Hardware Fingerprinting-Based Device Identifier for Zero-Trust IoT Security," IEEE Wireless Communications 31.2 (2024) (7 Pages).

Rostami, Mohamadreza, et al. "Beyond random inputs: A novel ml-based hardware fuzzing." 2024 Design, Automation & Test in Europe Conference & Exhibition. IEEE. (2024) (6 Pages).

Gaikwad, Pravin, et al. "Third-party hardware IP assurance against Trojans through supervised learning and post-processing." arXiv preprint arXiv:2111.14956. IEEE. (2021) (13 Pages).

* cited by examiner

| Data Processing System | Peripheral Device |
|---|---|
| 120A | 192A |
| 120A | 192B |
| 120B | 192C |
| 120C | 192D |
| ... | ... |

182

PERIPHERAL DEVICE SHARING BETWEEN DATA PROCESSING SYSTEMS

FIELD

Embodiments disclosed herein relate generally to device management. More particularly, embodiments disclosed herein relate to systems and methods for sharing peripheral device use between data processing systems.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
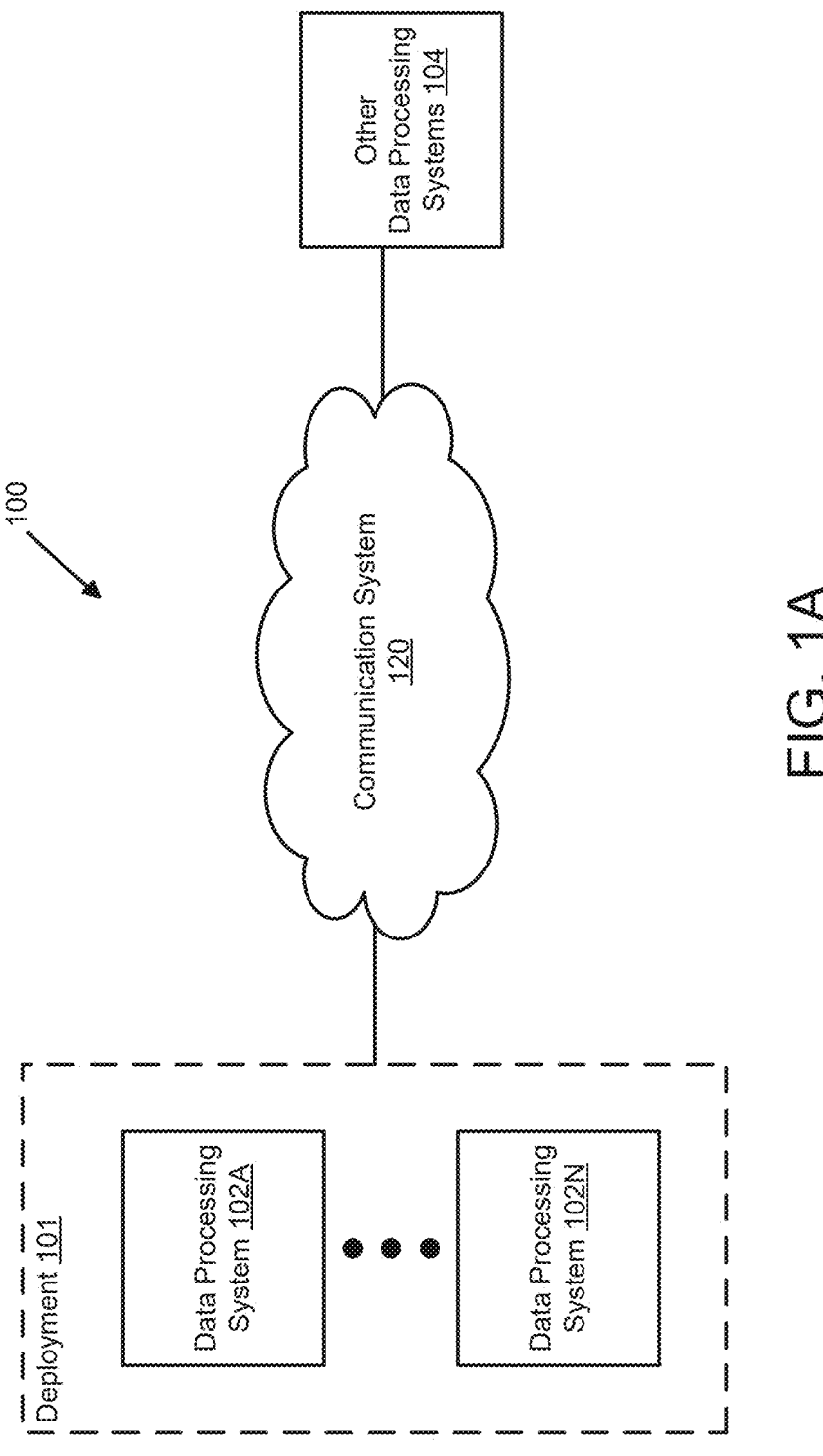
FIG. 1A shows a block diagram illustrating a system in accordance with one or more embodiments.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing peripheral device use between two or more data processing systems. In particular, peripheral devices such as channel cards (e.g., a fiber channel card, or the like), network interface cards (NICs), graphical processing units (GPU), data processing units (DPUs), digital signal processors (DSPs), or the like may be installed into a data processing system (see, e.g., the computing device of FIG. 4) to allow the data processing system to access new and/or expanded functionalities (e.g., network access functionalities, expanded storage space functionalities, or the like) for providing new and/or improved services.

For example, a NIC is an add-in/expansion card for a computing device (e.g., the data processing system) that provides a hardware connection that allows the data processing system to be plugged into a network (e.g., the Internet, or the like). A GPU is also an add-in/expansion card that allows the data processing system to perform faster calculations.

However, the data processing system may have limited space, power, and connections for these peripheral devices. For example, depending on its default hardware configuration and system capabilities, a data processing system may be limited to installation of only one or two peripheral devices. As a result, it becomes difficult for providers of these data processing systems and peripheral devices to provide users of data processing systems with access to all of the services (e.g., computer-implemented services) desired by the users.

To resolve such limitations of data processing systems and peripheral devices, a compute express link (CXL) switch may be provided to connect multiple data processing systems to multiple external peripheral devices, creating a configuration where the peripheral devices are being shared between these data processing systems as a service. The CXL standard used in CXL switches provides a low-latency, high-bandwidth interconnect technology that enables devices to share memory and cache resources directly with each other. By eliminating the need for data to be transferred over the interconnect, CXL switches reduce latency and improve performance for applications that require large amounts of data to be processed quickly and provide for high-speed communication between peripheral devices and data processing systems in deployments (e.g., data centers, or the like).

Figure 1B:
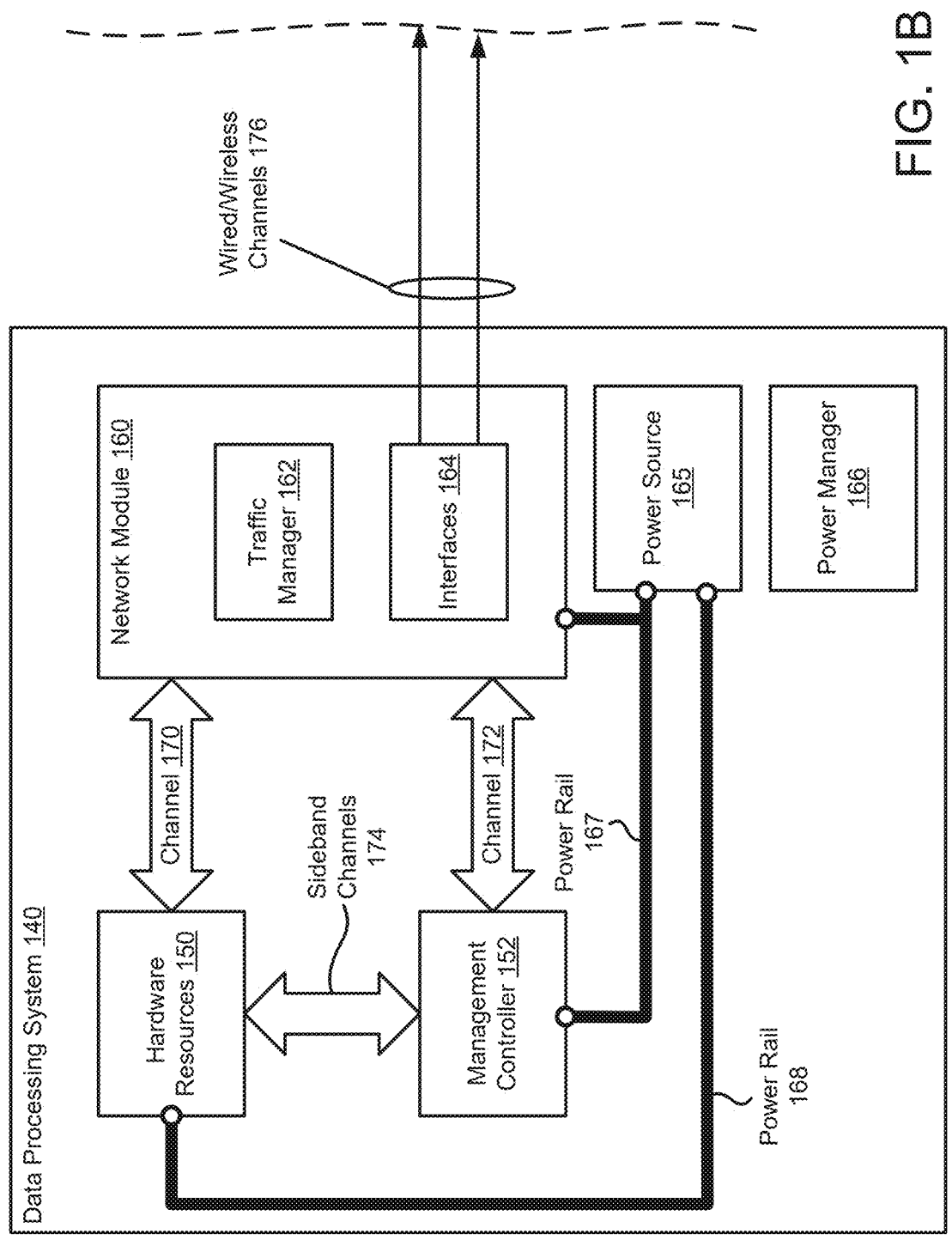
FIG. 1B shows a block diagram illustrating a data processing system in accordance with one or more embodiments.
Figure 1C:
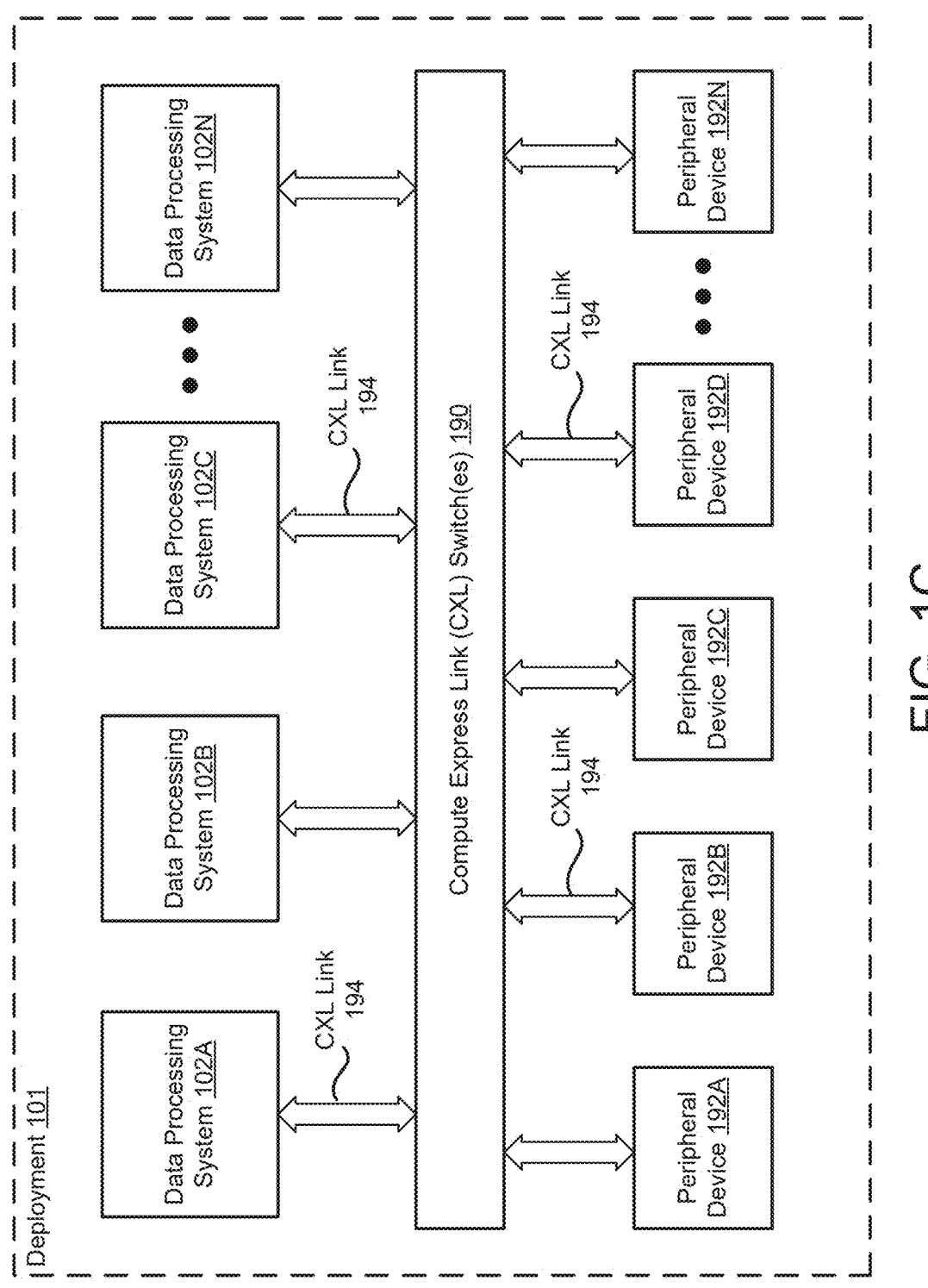
FIG. 1C shows a block diagram illustrating an example deployment in accordance with one or more embodiments.
Figures 1D, 1E:
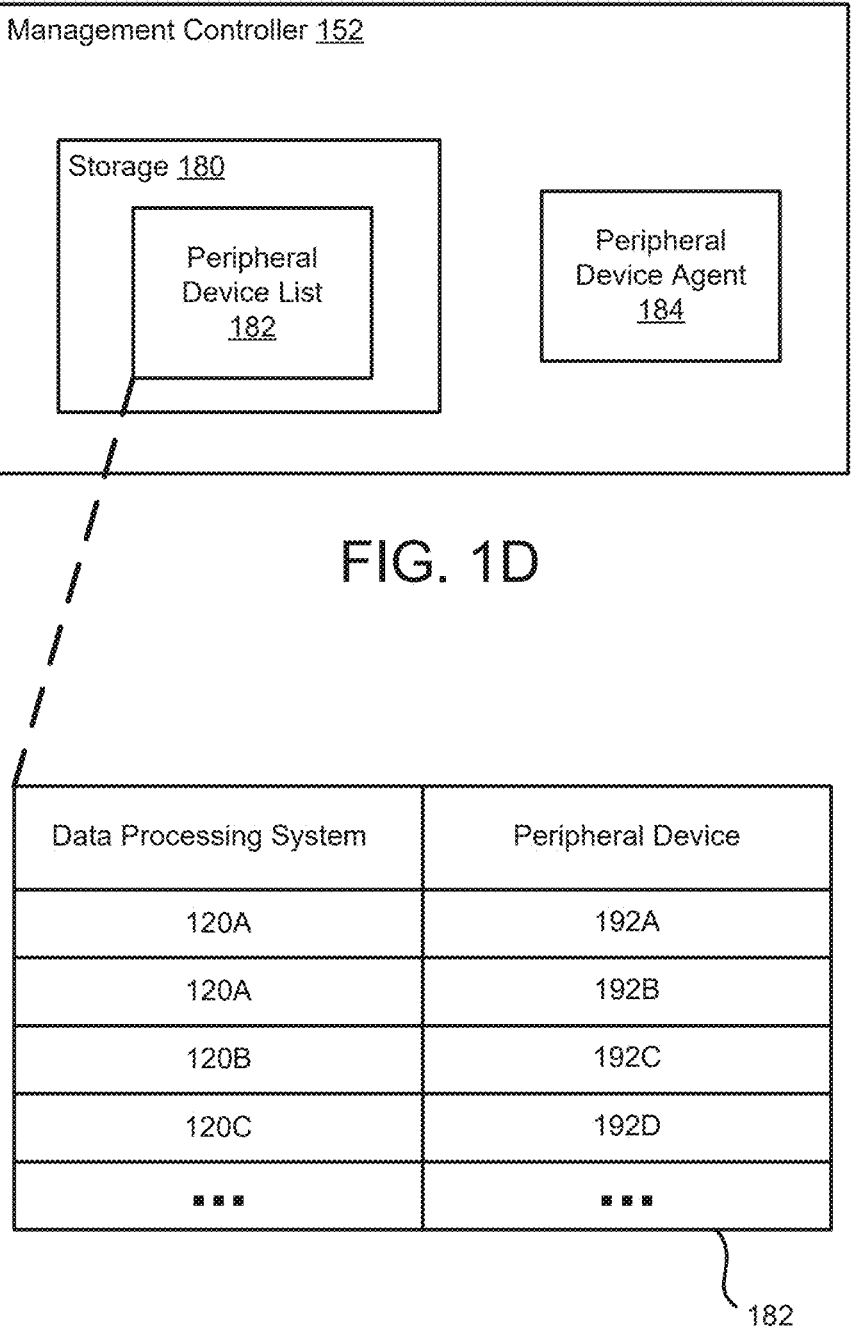
FIG. 1D shows a block diagram illustrating an example management controller in accordance with one or more embodiments.
FIG. 1E shows a block diagram illustrating an example peripheral device list in accordance with one or more embodiments.

A management controller (e.g., a baseboard management controller (BMC) in the form of a microcontroller, or the like as discussed in more detail before in reference to FIGS. 1B and 1D), may be configured to control (e.g., manage) access to each of these peripheral devices by each of the data processing systems. The management controller may also be configured to operate independently from a central processing unit (CPU) of the data processing system and be configured with its own limited computing resources (e.g., processing power, memory, power, or the like) separate from the limited computing resources of the data processing system in which the management controller is installed.

Thus, embodiments disclosed herein may provide, among others an improvement (e.g., a technical improvement) to the above-discussed limitations of data processing systems' ability to access multiple peripheral devices. By providing data processing systems with access to virtually an unlimited number of peripheral devices, the functionalities of the data processing systems (e.g., the capabilities for these data processing systems to provide computer-implemented services to users) is also advantageously improved.

Even further, by configuring the management controller as the manager of the peripheral devices and peripheral device access capabilities, the functionalities of these data processing systems may further be improved as the base computing resources (e.g., the default computing resources provided at the time of manufacturing) may be saved for other purposes (e.g., providing other computer-implemented services or running other processes) that better suits the users' of the data processing systems' needs.

In an embodiment, a method for managing access to one or more peripheral devices by one or more data processing systems is provided. The method may include: obtaining, by a management controller of a first data processing system of the one or more data processing systems, a first peripheral device use request for access to a first peripheral device among the one or more peripheral devices, the first peripheral device use request being obtained from a second data processing system of the one or more data processing systems; making a first determination, by the management controller, that the first peripheral device is not in use by any of the one or more data processing systems including the first data processing system; and permitting, by the management controller and based on the first determination, use of the first peripheral device by the second data processing system.

The method may further include: obtaining, by the management controller, a second peripheral device use request to a second peripheral device among the one or more peripheral devices, the second peripheral device use request being obtained from the second data processing system; making a second determination, by the management controller, that the second peripheral device is in use by one of the one or more data processing systems; and rejecting, by the management controller and based on the second determination, use of the second peripheral device by the second data processing system.

The method may further include: obtaining, by the management controller and from the second data processing system, a request for extra computing resources for a computer-implemented service currently being provided by the second data processing system; making a third determination, by the management controller, that a third peripheral device among the one or more peripheral devices is capable of providing computing resources matching the extra computing resources requested by the second data processing system; making a fourth determination, by the management controller and based on the third determination, that the third peripheral device is not in use by any of the one or more data processing systems including the first data processing system; and permitting, by the management controller and based on the fourth determination, use of the third peripheral device by the second data processing system.

The one or more peripheral devices are connected to the one or more data processing systems via a compute express link (CXL) switch.

Permitting use of the first peripheral device and the third peripheral device by the second data processing system may include permitting the second data processing system to establish connections to the first peripheral device and the third peripheral device, respectively, via the CXL switch for the second data processing system to access functionalities of the first peripheral device and the third peripheral device.

The method may further include: obtaining, by the management controller, information regarding the one or more peripheral devices connected on the CXL switch, the information comprising configuration information of each of the one or more peripheral devices and connection information of each of the one or more peripheral devices, the connection information indicating whether a peripheral device of the one or more peripheral devices is connected to any of the one or more data processing systems; storing, by the management controller, the information in a peripheral device list; and using, by the management controller, the peripheral device list to make the first determination, the second determination, the third determination, and the fourth determination.

The management controller is a microcontroller installed within the first data processing system that operates independently of a central processing unit (CPU) of the first data processing system.

A non-transitory media may include instructions that when executed by a processor cause the computer-implemented method to be performed.

A data processing system may include the non-transitory media and a processor, and may perform the computer-implemented method when the processor executes the instructions in the non-transitory media.

Turning to FIG. 1A, a block diagram illustrating a system 100 in accordance with an embodiment is shown. The system 100 shown in FIG. 1A may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system 100 may include any number of data processing systems 102A-102N and other data processing systems 104. The data processing systems 102A-102N may be grouped together within one or more deployments 101 (e.g., a server farm, a collection of computing devices within an entity, a data center, or the like). Data processing systems 102A-102N may provide the computer implemented services to users of these data processing systems 102A-102N and/or to other devices (e.g., other data processing systems 104 such as a remote server and/or computing device connected to the data processing systems 102A-102N of deployment 101 via communication system 120). Different data processing systems (e.g., any of data processing systems 102A-102N and/or other data processing systems 104) may provide similar and/or different computer implemented services.

To provide the computer implemented services, these data processing systems (e.g., any of data processing systems 102A-102N and/or other data processing systems 104) may include various hardware components (e.g., processors, memory modules, storage devices, etc.) and host various software components (e.g., operating systems, application, startup managers such as basic input-output systems, etc.). These hardware and software components (discussed in more detail below in FIGS. 1B-1C) may provide the computer implemented services via their operation.

Additional hardware components (e.g., add-in/expansion related hardware components, or the like) such as peripheral devices including channel cards (e.g., a fiber channel card, or the like), network interface cards (NICs), graphical processing units (GPU), data processing units (DPUs), digital signal processors (DSPs), or the like may provide the data processing systems (e.g., any of data processing systems 102A-102N and/or other data processing systems 104) to additional (e.g., new, expanded, or the like) capabilities, functionalities, and/or computing resources. Such additional capabilities, functionalities, and/or computing resources allow the data processing systems to provide additional (e.g., new, expanded, or the like) computer-implemented services (e.g., network connection, improved storage capacities, improved computing/processing speed, or the like) to users of the data processing system.

However, due to various limitations (e.g., space, power, limited physical connections limitations or the like) of data processing systems only a limited number of peripheral devices can be installed within a single data processing system, limiting the number of additional computer-implemented services the data processing can provide.

To resolve such limitations of data processing systems and peripheral devices, a compute express link (CXL) switch may be provided to connect multiple data processing systems to multiple external peripheral devices, creating a configuration where the peripheral devices are being shared between these data processing systems as a service.

A management controller (e.g., a baseboard management controller (BMC) in the form of a microcontroller, or the like as discussed in more detail before in reference to FIGS. 1B and 1D), may be configured to control (e.g., manage) access to each of these peripheral devices by each of the data processing systems. The management controller may also be configured to operate independently from a central processing unit (CPU) of the data processing system and be configured with its own limited computing resources (e.g., processing power, memory, power, or the like) separate from the limited computing resources of the data processing system in which the management controller is installed.

The software components may be implemented using various types of services. For example, each data processing system (e.g., any of data processing systems 102A-102N and/or other data processing systems 104) of system 100 may host various services that provide the computer implemented service (e.g., application services) and/or that manage the operation of these services (e.g., management services). The aggregate (e.g., combination) of the management and application services may be a complete service that provide desired functionalities.

Any of the components illustrated in FIG. 1A may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the Internet Protocol).

While FIG. 1A is illustrated as including a limited number of specific components, a system in accordance with an embodiment may include fewer, additional, and/or different components than those illustrated therein.

Turning to FIG. 1B, a diagram illustrating data processing system 140 in accordance with an embodiment is shown. Data processing system 140 may be similar to any of the data processing systems (e.g., any one of data processing systems 102A-102N or the other data processing systems 104) shown in FIG. 1A.

To provide computer implemented services, data processing system 140 may include any quantity of hardware resources 150. Hardware resources 150 may be in-band hardware components, and may include a processor operably coupled to memory, storage, and/or other hardware components. These hardware resources 150 (in addition to network module 160, management controller 152, power source 165, power manager 166, and the other components shown in FIG. 1B) may be the default hardware components that are included in the data processing system 140 by a manufacturer of the data processing systems 140. However, it could be appreciated that the default hardware components may include more (or less) of what is shown in FIG. 1B.

The processor (e.g., a central processing unit (CPU) installed on a motherboard, or the like) may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer implemented services. The applications may utilize various services provided by the management entities and use (at least indirectly) the network stack to communication with other entities.

In embodiments, the processor (of the hardware resources 150) may be a main processor (e.g., the central processing unit (CPU) and motherboard on which the CPU is installed) of the data processing system 140. The processor (of the hardware resources 150), may also be the main processor on which an operating system (OS) of the data processing system 140 is stored and runs.

In embodiments, use of the network stack and the services provided by the management entities may place the applications at risk of indirect compromise. For example, if any of these entities trusted by the applications are compromised, these entities may subsequently compromise the operation of the applications. For example, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 140) to another device via any number of intermediate networks (e.g., via wired/wireless channels 176 that are part of the networks).

To reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a data processing system 140). For example, management controller 152 may be a baseboard management controller (BMC), or the like.

Management controller 152 may provide various management functionalities for data processing system 140. For example, management controller 152 may monitor various ongoing processes performed by the in-band component, may manage power distribution, thermal management, and/or other functions of data processing system 140. To conduct such monitoring and provide such functions, the management controller 152 may include its own processor (e.g., a second processor separate and operating independently from the main processer of the data processing system).

Additionally, management controller 152 may be operably connected to various components via sideband channels 174 (in FIG. 1B, a limited number of sideband channels are included for illustrative purposes, it will be appreciated that management controller 152 may communication with other components (including peripheral devices installed within the data processing system 140) via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 140 via separate channels (e.g., 172) from the in-band components, and may implement or otherwise utilize a distinct and independent network stack (e.g., TCP/IP). Consequently, management controller 152 may communication with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 140 may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 140, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 140 may appear to be two independent network entities, that may independently addressable, and otherwise unrelated to one another.

To facilitate management of data processing system 140 over time, hardware resources 150, management controller 152 and/or network module 160 may be positioned in separately controllable power domains. By being positioned in these separately power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons. Said another way, as long as the data processing system is connected to a power source (e.g., a batter, a wall outlet, a generator, or the like), management controller 152 may still be powered on and operational while the data processing system itself is in a powered off (e.g., shut down/shut off) state. More specifically, turning off the data processing system 140 (e.g., via a shut down command) does not also turn off the management controller 152. As a result, the management controller 152 may still perform processes (e.g., perform the processes, operations, steps, or the like of the data flow diagrams and flowcharts discussed below in reference to FIGS. 2-3B) while the data processing system 140 itself is in a powered off/shut off state.

To implement the separate power domains, data processing system 140 may include a power source (e.g., 165) that separately supplies power to power rails (e.g., 167, 168) that power the respective power domains. Power from the power source (e.g., one or more power supplies, batteries, or other types of PSUs etc.) may be selectively provided to the separate power rails to selectively power the different power domains. A power manager (e.g., 166) may manage power from power source 165 that is supplied to the power rails. Management controller 152 may cooperate with power manager 166 to manage supply of power to these power domains. For example, management controller 152 may cooperate with power manager 166 to determine a remaining power budget and/or a remaining power availability of the data processing system (as discussed in more detail below in reference to FIG. 1C and FIG. 2A).

In FIG. 1B, an example implementation of separate power domains using power rails 167-168 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

In addition to the components (e.g., hardware resources 150, network module 160, management controller 152, power source 165, power manager 166, power rails 167-168, components making up channels 170-172 and sideband channels 174, etc.) additional hardware components (e.g., peripheral devices) may be installed within (or externally to) the data processing system.

In embodiments, these peripheral devices may include channel cards (e.g., a fiber channel card, or the like), network interface cards (NICs), graphical processing units (GPU), data processing units (DPUs), digital signal processors (DSPs), or the like and may communicate with the existing components of the data processing system 140 via various interfaces (e.g., one or more Peripheral Component Interconnect Express (PCIe) buses, universal serial buses (USB), or the like).

These peripheral devices may also draw power from the power source 165 in order to provide their functions (e.g., may be powered entirely, or in part, by power supplied from the power source 165 of the data processing system 140). Each of these peripheral devices may have one or more power rating values (e.g., a minimum, average, optimal, maximum, or the like power rating value) (also referred to herein simply as "power rating") as defined by a manufacturer and/or provider of these peripheral devices.

Turning to FIG. 1C, a diagram illustrating an example of deployment 101 (of FIG. 1A) in accordance with an embodiment is shown. As shown in FIG. 1C, the deployment 101 may include any number of data processing systems (e.g., data processing systems 102A, 102B, 102C, and through 102N). The deployment may also include any number of peripheral devices 192A-192N.

In embodiments, each of the peripheral devices 192A-192N may be installed internally (e.g., within) and/or externally of (e.g., outside of) the data processing systems 102A-102N. More specifically, in one example, all of the peripheral devices 192A-192N may be installed on a rack (e.g., a server rack, or the like) with an independent power source (e.g., an independent power supply from the PSU(s) of each of the data processing systems 102A-102N. In another example, all of the peripheral devices 192A-192N may be installed (e.g., disposed in) a chassis of respective ones of the data processing systems 102A-102N. In yet another example, some of the peripheral devices 192A-192N may be installed on the rack while others (not installed on the rack) may be installed (e.g., disposed in) the chassis of respective ones of the data processing systems 102A-102N.

Each of the peripheral devices 192A-192N may be connected to each of the data processing systems 102A-102N via one or more CXL switches 190, creating a CXL link 194 between each of the data processing systems 102A-102N and each of the peripheral devices 192A-192N.

Thus, in such a configuration shown in FIG. 1C, each data processing systems 102A-102N has the capability to communicate (e.g., exchange data) with and use any (or all) of the peripheral devices 192A-192N included within the deployment 101.

Turning to FIG. 1D, a diagram illustrating an example of a management controller 152 of data processing system 140 in accordance with an embodiment is shown. As shown in FIG. 1C, the management controller 152 may include storage 180 and peripheral device agent 184. Each of these components will be described as follows.

The peripheral device agent 184 may be configured using hardware, software, or a combination of both. For example, peripheral device agent 184 may be a daemon thread (e.g., a low priority daemon job) executing on one or more hardware components of the management controller 152. The peripheral device agent 184 may also be an application executing on the management controller 152.

The peripheral device agent 184 may be configured to manage each data processing system's (e.g., the data processing systems 102A-102N of example deployment 101 shown in FIG. 1C) access to one or more peripheral devices (e.g., the peripheral devices 192A-192N of example deployment 101 shown in FIG. 1C) within a deployment (e.g., 101, FIG. 1C). The peripheral device agent 184 may also be configured to store data (e.g., configuration data, location data, or the like) associated with the one or more peripheral devices available within the deployment.

In embodiments, one of the data processing systems within a deployment may be assigned as a master data processing system. The peripheral device agent 184 of this master data processing system may in turn be configured as a master peripheral device agent (and the management controller having this master peripheral device agent similarly being a master management controller).

The master data processing system (e.g., through the master management controller having the master peripheral device agent) may be tasked with managing the peripheral devices of the deployment (e.g., 101, FIG. 1C). For example, Storage 180 may be implemented using any type and combination of storage devices and/or memory (e.g., hard disk drive (HDD), solid state drive (SSD), random access memory (RAM), or the like). Storage 180 may be an independent storage of the management controller 152 (e.g., independent from the storage(s) of the data processing system 140 that are part of the hardware resources 150). Said another way, the storage(s) making up part of hardware resources 150 may be the main storage(s) of the data processing system 140 while storage 180 is a second storage that is independent and separate from the main storage(s).

Storage 180 may be configured to store one or more peripheral device lists 182. Each peripheral device list 182 may store any type of information associated with the peripheral devices available within a deployment. More specifically, the peripheral device list 182 may include information of all peripheral devices connected to one or more CXL switches within a deployment.

The information stored within the peripheral device list 182 may include: (i) configuration information of each of the peripheral devices; (ii) an identification (ID) (e.g., a serial number, a model number or name, or the like), of each of the peripheral devices; (iii) location information (also referred to herein as "connection information") of each of the peripheral devices, where the location information indicates whether the a peripheral device is connected to a data processing system; (iv) a description of the functionalities and capabilities of each peripheral device; (v) an ID of the data processing systems; or the like.

Other information associated with the peripheral devices and their respective connections to the data processing systems not included above may also be included within the peripheral device list 182 without departing from the scope of embodiments disclosed herein.

In particular, an example peripheral device list 182 is shown in FIG. 1E. As shown in FIG. 1E, the example peripheral device list 182 shows (in the left column) an ID of all of the data processing systems (e.g., 102A-102N of FIG. 1C) within the deployment and (in the right column) all of the peripheral devices connected to each of the data processing systems.

More specifically, as shown in the example peripheral device list 182 of FIG. 1E, peripheral devices 192A and 192B are both currently connected to data processing system 120A while peripheral device 192C is connected to data processing system 120B and peripheral device 192D is connected to data processing system 120C. In embodiments, a peripheral device may only be connected to a single data processing system (e.g., two or more data processing systems cannot be connected to a same peripheral device).

In embodiments, the peripheral device list 182 may be updated (e.g., by the master peripheral device agent of the master management controller) as peripheral devices are removed and/or added to the CXL switches (e.g., 190, FIG. 1C) of the deployment. The peripheral device list 182 may be provided to (e.g., by the master peripheral device agent of the master management controller) each of the management controllers of all of the data processing systems within the deployment.

As discussed below in reference to FIGS. 2 and 3A-3B, the master peripheral device agent may use the peripheral device list 182 to manage (e.g., permit or reject) access to the peripheral devices by the data processing systems of a deployment.

Although not shown in FIG. 1D, management controller may also include other components such as its own set of hardware components (e.g., the second processor, one or more other memories/storages beside storage 180 that are independent and separate from the memor(ies) of the data processing system 140, or the like) and its own set of software components (e.g., a set of applications independent and separate from the applications running on the other components of the data processing system 140 of FIG. 1B).

Figure 2:
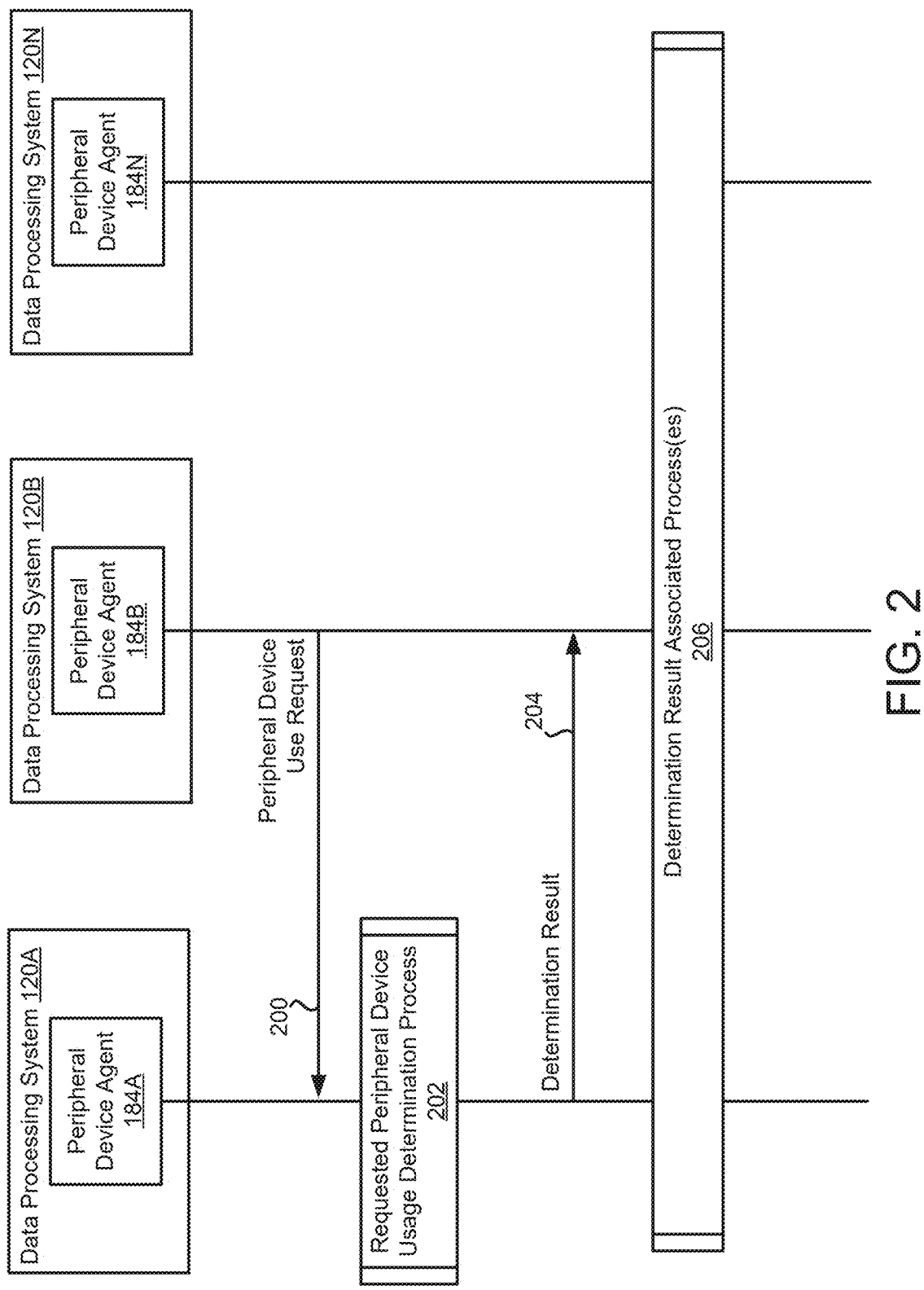
FIG. 2 shows an interaction diagram in accordance with one or more embodiments.

To further clarify embodiments disclosed herein, an inter-actions diagram in accordance with an embodiment is shown in FIG. 2. This interactions diagram may illustrate how the peripheral devices within a deployment may be managed by the master peripheral device agent as discussed above in reference to the diagrams shown in FIGS. 1C and 1D.

In the interaction diagram, processes performed by and interactions between components of a system in accordance with an embodiment are shown. In the diagrams, components of the system are illustrated using a first set of shapes (e.g., 184A-184N, 102A-102N, etc.), located towards the top of each figure. Solid lines descend from this first set of shapes to indicate that the devices are operating during the corresponding period of time.

Processes performed by the components of the system are illustrated using a second set of shapes (e.g., 202, 206, etc.) superimposed over these lines. Interactions (e.g., communication, data transmissions, etc.) between the components of the system are illustrated using a third set of shapes (e.g., 200, 204, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 200 may occur prior to the interaction labeled as 204. However, it will be appreciated that the processes and interactions may be performed in different orders, any may be omitted, and other processes or interactions may be performed without departing from embodiments disclosed herein.

Turning to FIG. 2, a first interaction diagram in accordance with an embodiment is shown. In this first interaction diagram of FIG. 2, assume that the data processing system 102A is set as the master data processing system. Accordingly, the peripheral device agent 184A of this data processing system 102A is also the master peripheral device agent.

At interaction 200, data processing system 120B (via its peripheral device agent 184B) provides (e.g., transmits) a peripheral device use request to the master peripheral device agent (e.g., 184A) of the master data processing system (e.g., 120A).

Prior to transmitting the peripheral device use request, the peripheral device agent 184B may check its locally stored peripheral device list (e.g., 182, FIG. 1D) to determine if there are any peripheral devices within the deployment that data processing system 120B needs and/or wants to use (e.g., based on explicit instructions provided by a user, by data processing system 120B determining via its main processor that one or more processes currently active on data processing system 120B will require the additional functions, capabilities, and/or resources of one of the peripheral devices, or the like).

Any methods for determining whether a peripheral device is needed by a data processing system may be used without departing from the scope of embodiments disclosed herein.

Upon obtaining (e.g., receiving) the peripheral device use request, the master peripheral device agent (e.g., 184A) performs requested peripheral device usage determination process 202 to determine whether data processing system 120B should be permitted access to the requested peripheral device (or devices).

As part of peripheral device usage determination process 202, the master peripheral device agent (e.g., 184A) may first check the locally stored peripheral device list (e.g., 182, FIG. 1D) to determine whether the requested peripheral device (or devices) is connected to any data processing systems within the deployment (for example, connected to data processing system 120N in FIG. 2). If no processing systems are connected to the requested peripheral device (or devices), the master peripheral device agent (e.g., 184A) will grant data processing system 120B access to the requested peripheral device (or devices) via the determination results provided to data processing system 120B (e.g., via interaction 204).

Alternatively, if the master peripheral device agent (e.g., 184A) determines that there is a data processing system connected to the requested peripheral device (or devices), the master peripheral device agent (e.g., 184A) will determine (e.g., by contacting that data processing device, by analyzing the flow of data on the CXL switch, or the like) whether that data processing system connected to the requested peripheral device (or devices) is using (e.g., performing services using) the requested peripheral device (or devices).

If the requested peripheral device (or devices) is being used by that data processing system, then the master peripheral device agent (e.g., 184A) will reject (e.g., via the determination results provided in interaction 204) data processing system 120B's initial request (e.g., in interaction 200) to use the peripheral device(s). If, however, the requested peripheral device (or devices) is not being used by that data processing system, then the master peripheral device agent (e.g., 184A) will permit (e.g., via the determination results provided in interaction 204) data processing system 120B to connect to and use the peripheral device.

In embodiments, one or more determination results associated processes 206 may be performed by all three of the data processing systems 120A, 120B, and 120N. For example, when the master peripheral device agent (e.g., 184A) permits (e.g., via the determination results provided in interaction 204) data processing system 120B to connect to and use a peripheral device already connected to another data processing system (e.g., 120N), the master peripheral device agent may simultaneously transmit (e.g., provide) instructions to data processing system 120N to disconnect from the peripheral device so that data processing system 120B can establish a new connection with that peripheral device.

Additionally, once data processing system 120B connects to the requested peripheral device (or devices), the master peripheral device agent (e.g., 184A) may update the locally stored peripheral device list 182 to show this new connection between data processing system 120B and the requested peripheral device (or devices) (while also updating the locally stored peripheral device list 182 to show any removal of connections that were required to free up any existing connections between the requested peripheral device (or devices) and other ones of the data processing systems). This updated peripheral device list 182 may then be propagated (e.g., by the master peripheral device agent (e.g., 184A)) to all of the other peripheral device agents of the data processing systems within the deployment so that all of the master peripheral device agents will have the most up-to-date information on the existing connections between the peripheral devices and data processing systems within the deployment.

Any of the processes illustrated in FIG. 2 using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated in FIG. 2 using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metaloxide semiconductor based devices (e.g., computer chips).

As discussed above, the components of FIGS. 1A-1D may perform various methods for managing a boot up process of a data processing system. FIGS. 3A and 3B illustrate examples of methods that may be performed by the components of FIGS. 1A-1D. For example, any of the data processing systems 102A-102N and the other data processing systems 104 shown in FIG. 1A may perform all or a portion of the methods. In the diagrams discussed below and shown in FIGS. 3A and 3B, any of the operations may be repeated, performed in different orders, and/or performed in parallel with or in a partially overlapping in time manner with other operations.

Figure 3A:
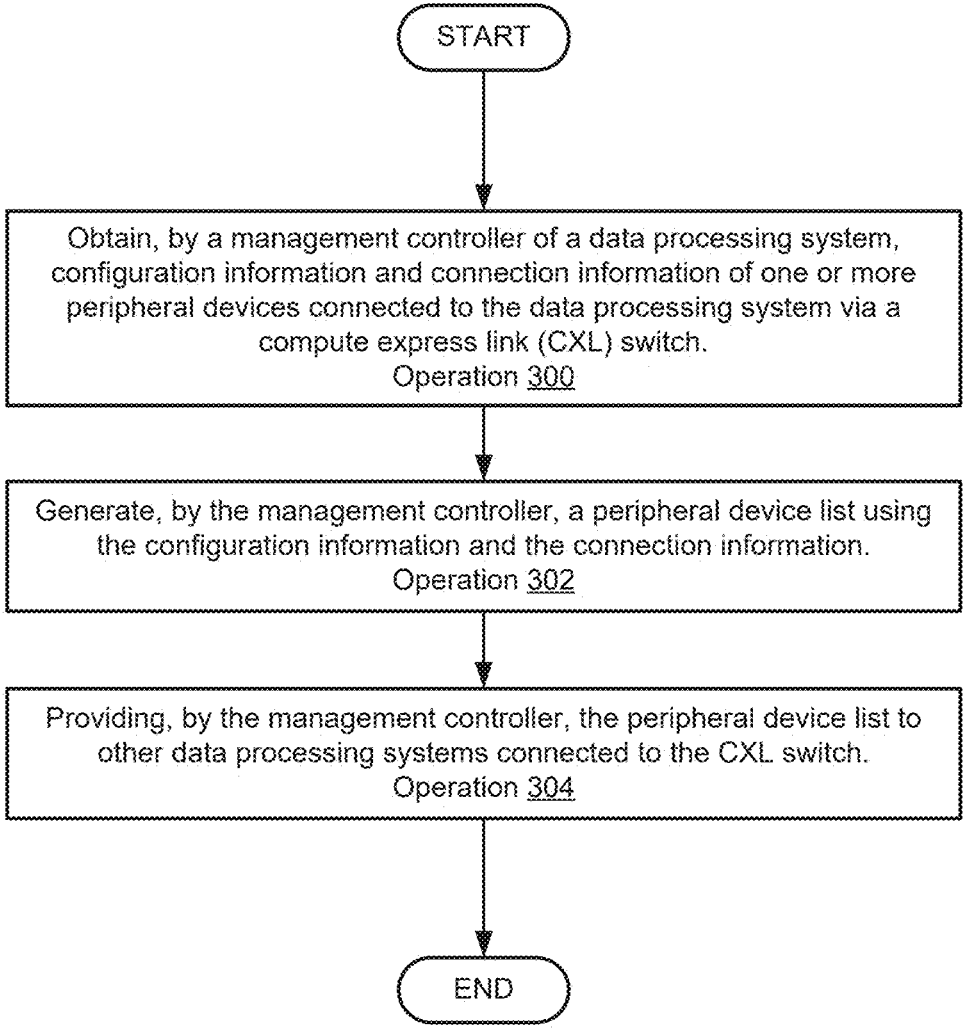
FIGS. 3A-3B show flowcharts in accordance with one or more embodiments.

Starting with FIG. 3A, in Operation 300 and as discussed above in reference to FIGS. 1D and 1E, a management controller (e.g., management controller 152 of FIG. 1B) of a data processing system may obtain configuration information and connection information of one or more peripheral devices connected to the data processing system via a compute express link (CXL) switch.

The configuration information and connection information (and any other related information) may be obtained using any processes (e.g., application programming interface (API) calls, or the like) and techniques without departing from the scope of embodiments disclosed herein.

At Operation 302, as discussed above in reference to FIGS. 1D and 1E, the management controller may generate a peripheral device list (e.g., 182, FIGS. 1D-1E) using the configuration information and the connection information.

At Operation 304, as discussed above in reference to FIGS. 1D and 1E, the management controller may provide the peripheral device list to other data processing systems connected to the CXL switch.

In embodiments, the Operations (e.g., 300-304) of the method of FIG. 3A may be performed by the management controller through the peripheral device agent (e.g., 184, FIG. 1D) of the management controller. Additionally, the Operations (e.g., 300-304) of the method of FIG. 3A may be performed by a management controller of a master data processing system (e.g., a master management controller) within a deployment.

Figure 3B:
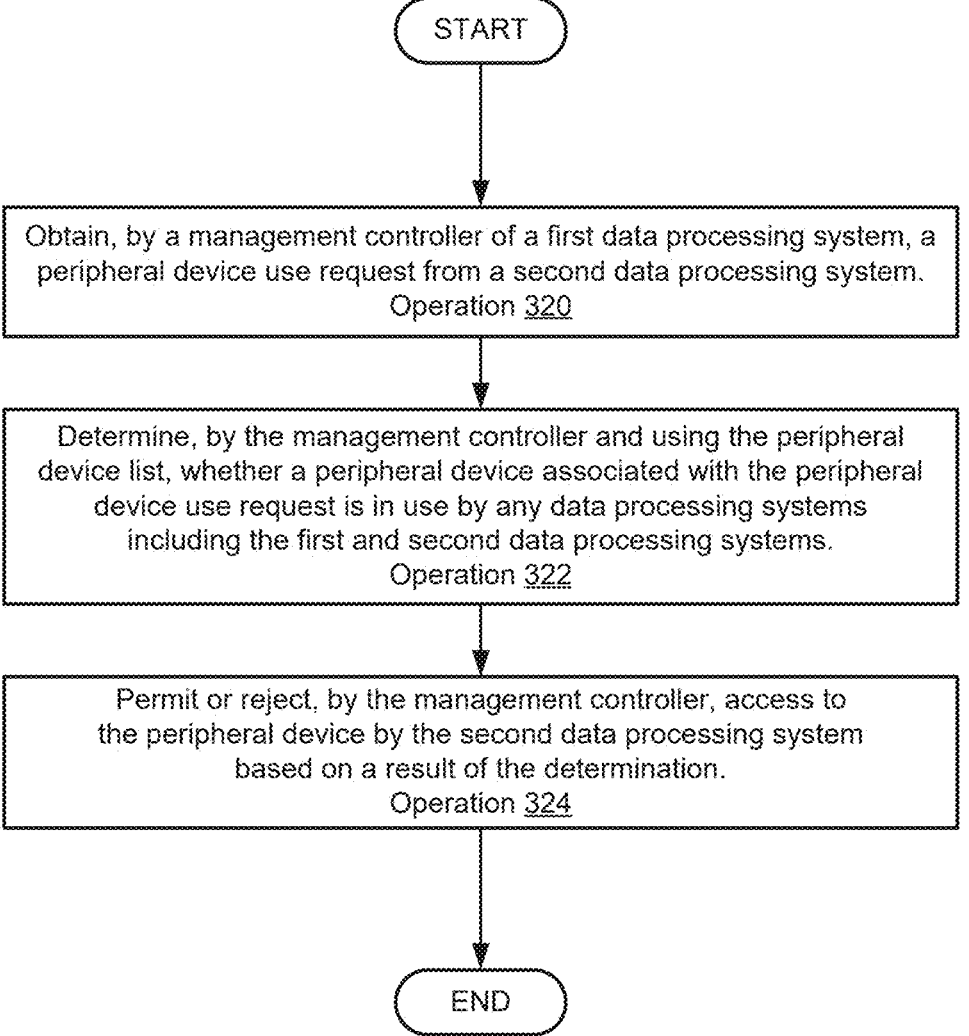

Turning now to FIG. 3B, in Operation 320, as discussed above in reference to FIG. 2, a management controller of a first data processing system may obtain a peripheral device use request from a second data processing system.

In Operation 320, as discussed above in reference to FIG. 2, the management controller of the first data processing system may determine whether a peripheral device associated with the peripheral device use request is in use by any data processing systems including the first and second data processing systems.

In embodiments, the peripheral device use request may specify the exact ID of the peripheral device. In embodiments, the peripheral device use request may specify a description of what the requesting data processing system needs. For example, the request may include a description requesting extra computing resources for a computer-implemented service currently being provided by the second data processing system (e.g., "need more storage space", or the like).

In Operation 322, as discussed above in reference to FIG. 2, the management controller of the first data processing system (here the master management controller), may determine whether a peripheral device associated with the peripheral device use request is in use by any data processing systems including the first and second data processing systems.

For example, if an exact ID is provided, the management controller of the first data processing system may search through the peripheral device list for an ID that matches the provided ID. As another example, if only a description of the required extra computing resources (or services) is provided, the management controller of the first data processing system may search through the peripheral device list to find one or more peripheral devices that best matches the type of extra computing resources (or services) being requested (e.g., if the request is for faster processing capabilities, a GPU among the peripheral device list may be selected).

In Operation 324, as discussed above in reference to FIG. 2, the management controller of the first data processing system may permit or reject access to the (requested) peripheral device by the second data processing system based on a result of the determination made in Operation 322.

In particular, if the (requested) peripheral device is currently in use by another data processing system, the peripheral device use request will be rejected. Alternatively, if the (requested) peripheral device is currently not in use by another data processing system, the peripheral device use request will be permitted.

The method of FIG. 3B may end following operation 324.

Figure 4:
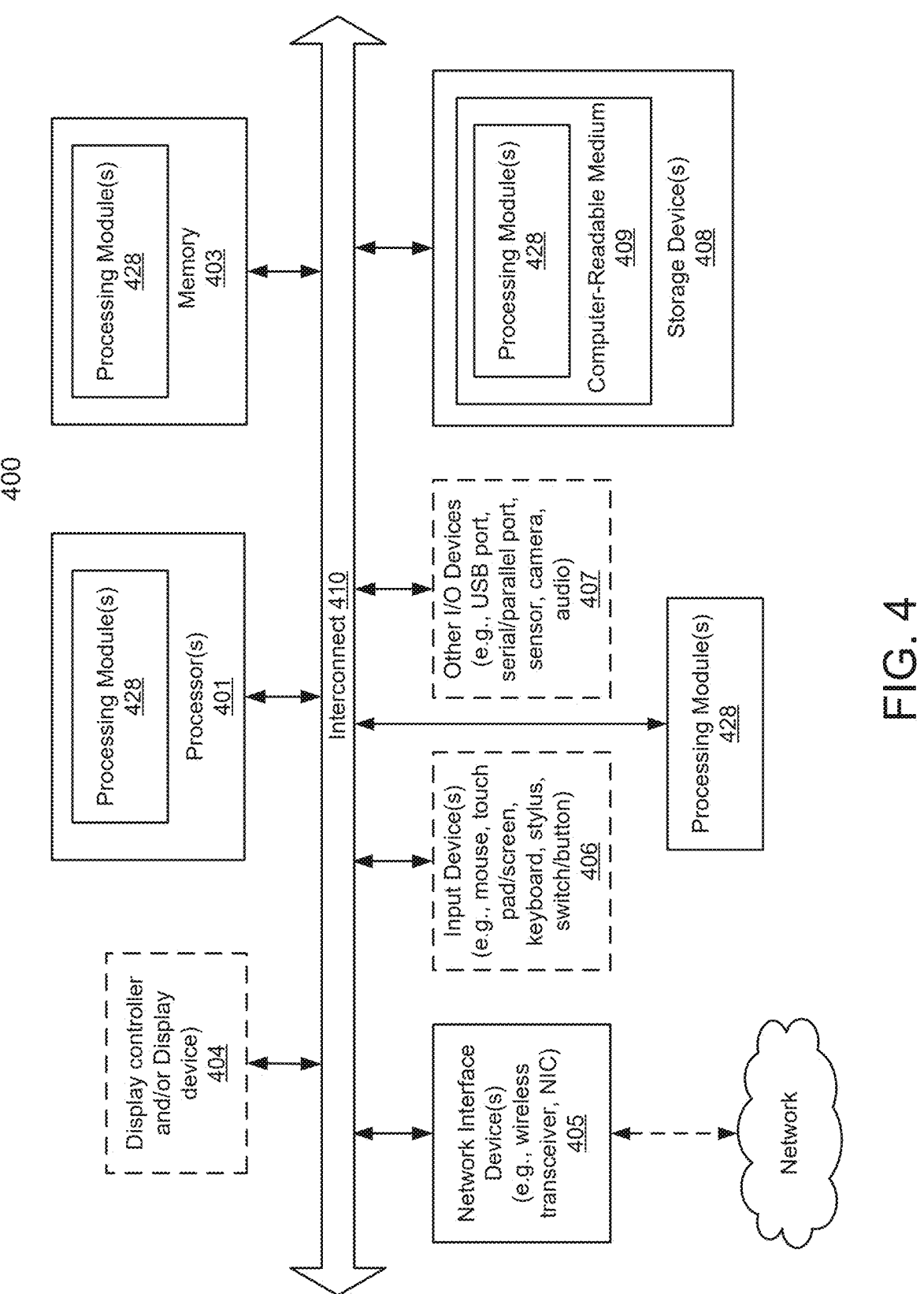
FIG. 4 shows a block diagram illustrating a computing device in accordance with one or more embodiments.

Any of the components illustrated in FIGS. 1A-3B may be implemented with one or more computing devices. Turning to FIG. 4, a block diagram illustrating an example of a computing device (also referred to herein as "system 400") in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing access to one or more peripheral devices by one or more data processing systems, the method comprising:

obtaining, by a management controller of a first data processing system of the one or more data processing systems, a first peripheral device use request for access to a first peripheral device among the one or more peripheral devices, the first peripheral device use request being obtained from a second data processing system of the one or more data processing systems; making a first determination, by the management controller, that the first peripheral device is not in use by any of the one or more data processing systems including the first data processing system; and permitting, by the management controller and based on the first determination, use of the first peripheral device by the second data processing system, wherein the method further comprising:

obtaining, by the management controller and from the second data processing system, a request for extra computing resources for a computer-implemented service currently being provided by the second data processing system;

making a third determination, by the management controller, that a third peripheral device among the one or more peripheral devices is capable of providing computing resources matching the extra computing resources requested by the second data processing system;

making a fourth determination, by the management controller and based on the third determination, that the third peripheral device is not in use by any of the one or more data processing systems including the first data processing system; and permitting, by the management controller and based on the fourth determination, use of the third peripheral device by the second data processing system.

2. The method of claim 1, further comprising:

obtaining, by the management controller, a second peripheral device use request to a second peripheral device among the one or more peripheral devices, the second peripheral device use request being obtained from the second data processing system;

making a second determination, by the management controller, that the second peripheral device is in use by one of the one or more data processing systems; and rejecting, by the management controller and based on the second determination, use of the second peripheral device by the second data processing system.

3. The method of claim 2, wherein the one or more peripheral devices are connected to the one or more data processing systems via a compute express link (CXL) switch.

4. The method of claim 3, wherein permitting use of the first peripheral device and the third peripheral device by the second data processing system comprises permitting the second data processing system to establish connections to the first peripheral device and the third peripheral device, respectively, via the CXL switch for the second data processing system to access functionalities of the first peripheral device and the third peripheral device.

5. The method of claim 3, further comprising:

obtaining, by the management controller, information regarding the one or more peripheral devices connected on the CXL switch, the information comprising configuration information of each of the one or more peripheral devices and connection information of each of the one or more peripheral devices, the connection information indicating whether a peripheral device of the one or more peripheral devices is connected to any of the one or more data processing systems.

6. The method of claim 1, wherein the management controller is a microcontroller installed within the first data processing system that operates independently of a central processing unit (CPU) of the first data processing system.

7. The method of claim 5, further comprising:

storing, by the management controller, the information in a peripheral device list; and using, by the management controller, the peripheral device list to make the first determination, the second determination, the third determination, and the fourth determination.

8. A non-transitory machine-readable medium having instructions stored therein, which when executed by a processor, cause the processor to perform operations for managing access to one or more peripheral devices by one or more data processing systems, the operations comprising:

obtaining, by a management controller of a first data processing system of the one or more data processing systems, a first peripheral device use request for access to a first peripheral device among the one or more peripheral devices, the first peripheral device use request being obtained from a second data processing system of the one or more data processing systems;

making a first determination, by the management controller, that the first peripheral device is not in use by any of the one or more data processing systems including the first data processing system; and permitting, by the management controller and based on the first determination, use of the first peripheral device by the second data processing system, wherein the operations further comprise:

obtaining, by the management controller and from the second data processing system, a request for extra computing resources for a computer- implemented service currently being provided by the second data processing system;

making a third determination, by the management controller, that a third peripheral device among the one or more peripheral devices is capable of providing computing resources matching the extra computing resources requested by the second data processing system;

making a fourth determination, by the management controller and based on the third determination, that the third peripheral device is not in use by any of the one or more data processing systems including the first data processing system; and permitting, by the management controller and based on the fourth determination, use of the third peripheral device by the second data processing system.

9. The non-transitory machine-readable medium of claim 8, wherein the operations further comprise:

obtaining, by the management controller, a second peripheral device use request to a second peripheral device among the one or more peripheral devices, the second peripheral device use request being obtained from the second data processing system;

making a second determination, by the management controller, that the second peripheral device is in use by one of the one or more data processing systems; and rejecting, by the management controller and based on the second determination, use of the second peripheral device by the second data processing system.

10. The non-transitory machine-readable medium of claim 9, wherein the one or more peripheral devices are connected to the one or more data processing systems via a compute express link (CXL) switch.

11. The non-transitory machine-readable medium of claim 10, wherein permitting use of the first peripheral device and the third peripheral device by the second data processing system comprises permitting the second data processing system to establish connections to the first peripheral device and the third peripheral device, respectively, via the CXL switch for the second data processing system to access functionalities of the first peripheral device and the third peripheral device.

12. The non-transitory machine-readable medium of claim 10, wherein the operations further comprise:

obtaining, by the management controller, information regarding the one or more peripheral devices connected on the CXL switch, the information comprising configuration information of each of the one or more peripheral devices and connection information of each of the one or more peripheral devices, the connection information indicating whether a peripheral device of the one or more peripheral devices is connected to any of the one or more data processing systems;

storing, by the management controller, the information in a peripheral device list; and using, by the management controller, the peripheral device list to make the first determination, the second determination, the third determination, and the fourth determination.

13. The non-transitory machine-readable medium of claim 8, wherein the management controller is a microcontroller installed within the first data processing system that operates independently of a central processing unit (CPU) of the first data processing system.

14. A data processing system, comprising:

a management controller, wherein data processing system stores instructions that causes the management controller to perform operations for managing access to one or more peripheral devices by one or more data processing systems, the data processing system being a first data processing system of the one or more data processing systems and the operations comprising:

obtaining a first peripheral device use request for access to a first peripheral device among the one or more peripheral devices, the first peripheral device use request being obtained from a second data processing system of the one or more data processing systems;

making a first determination that the first peripheral device is not in use by any of the one or more data processing systems including the first data processing system; and permitting, based on the first determination, use of the first peripheral device by the second data processing system, wherein the operations further comprise:

obtaining, from the second data processing system, a request for extra computing resources for a computer-implemented service currently being provided by the second data processing system;

making a third determination that a third peripheral device among the one or more peripheral devices is capable of providing computing resources matching the extra computing resources requested by the second data processing system;

making a fourth determination, based on the third determination, that the third peripheral device is not in use by any of the one or more data processing systems including the first data processing system; and permitting, based on the fourth determination, use of the third peripheral device by the second data processing system.

15. The data processing system of claim 14, wherein the operations further comprise:

obtaining a second peripheral device use request to a second peripheral device among the one or more peripheral devices, the second peripheral device use request being obtained from the second data processing system;

making a second determination that the second peripheral device is in use by one of the one or more data processing systems; and rejecting, based on the second determination, use of the second peripheral device by the second data processing system.

16. The data processing system of claim 15, wherein the one or more peripheral devices are connected to the one or more data processing systems via a compute express link (CXL) switch.

17. The data processing system of claim 16, wherein permitting use of the first peripheral device and the third peripheral device by the second data processing system comprises permitting the second data processing system to establish connections to the first peripheral device and the third peripheral device, respectively, via the CXL switch for the second data processing system to access functionalities of the first peripheral device and the third peripheral device.

18. The data processing system of claim 16, wherein the operations further comprise:

obtaining, by the management controller, information regarding the one or more peripheral devices connected on the CXL switch, the information comprising configuration information of each of the one or more peripheral devices and connection information of each of the one or more peripheral devices, the connection information indicating whether a peripheral device of the one or more peripheral devices is connected to any of the one or more data processing systems.

19. The data processing system of claim 18, wherein the operations further comprise:

storing, by the management controller, the information in a peripheral device list; and using, by the management controller, the peripheral device list to make the first determination, the second determination, the third determination, and the fourth determination.

20. The data processing system of claim 14, wherein the management controller is a microcontroller installed within the first data processing system that operates independently of a central processing unit (CPU) of the first data processing system.

* * * * *